United States Patent [19]

Yates et al.

[11] 3,883,363

[45] May 13, 1975

[54] FRIABLE COMPOSITION AND PROCESS

[75] Inventors: James E. Yates, Ponca City, Okla.; Wilfred M. Pinto, Mahtomedi, Minn.

[73] Assignee: Continental Oil Company, Ponca City, Okla.

[22] Filed: May 1, 1974

[21] Appl. No.: 465,789

Related U.S. Application Data

[63] Continuation-in-part of Ser. No. 425,379, Dec. 17, 1973, abandoned.

[52] U.S. Cl. .................................................. 106/268
[51] Int. Cl. ......................... C08h 9/06; C08h 17/36
[58] Field of Search ...................................... 106/268

[56] References Cited
UNITED STATES PATENTS 2,716,073   8/1955   Cunder .............................. 106/243

OTHER PUBLICATIONS

Warth "The Chemistry and Technology of Waxes" 1956, pgs. 570, 571, 397, 398, 414, 415.

*Primary Examiner*—Theodore Morris
*Attorney, Agent, or Firm*—R. J. Carlson

[57] ABSTRACT

Friable compositions suitable for use as extrusion aids in polymeric extrusion formulations are prepared by a process which comprises mixing a paraffinic hydrocarbon wax and calcium salt of a fatty acid while heating to a temperature of at least 150°C and thereafter cooling to recover a solid, glass-like, friable composition, said paraffinic hydrocarbon wax having a drop melting point of at least 110°F, an oil content of not greater than 50 percent by weight and a needle penetration value at 77°F in the range of 1 mm to 20 mm, and said fatty acid being a $C_{16}$–$C_{24}$ aliphatic hydrocarbon monocarboxylic acid or mixtures thereof.

10 Claims, No Drawings

FRIABLE COMPOSITION AND PROCESS

This is a continuation-in-part of Ser. No. 425,379, filed Dec. 17, 1973, now abandoned.

This invention relates to a composition derived from paraffinic hydrocarbon waxes and calcium salts of certain fatty acids which are solid, glass-like and friable at ambient conditions. The compositions can be ground or otherwise reduced to discrete particles having less tendency to fuse or coalesce than the paraffinic hydrocarbon waxes yet still begins to become fluidized at elevated temperatures of the order of 100°C or higher.

Polyvinyl chloride and other thermoplastic extrusion formulations commonly include paraffinic hydrocarbon waxes and calcium salts of certain fatty acids such as calcium stearate as extrusion aids. Since the extrusion formulations are generally fed to an extruder as a mixture of particulate solids, it is desirable that any additives to the formulations, including the above-mentioned extrusion aids, be in a discrete solid, particulate form and capable of being handled as solids. While the calcium salts present no difficulties along this line only certain high quality paraffinic hydrocarbon waxes can be used. Relatively soft waxes or those of a less pure nature containing quantities of oils or other solvents are generally unacceptable from a materials handling viewpoint; e.g., they may not form discrete particulate solids or they may not sufficiently retain such physical form on storage or both. As a result, a great many paraffinic hydrocarbon waxes are excluded from use with thermoplastic formulations although if it were not for their lack of materials handling capability they would be suitable extrusion aids in such formulations.

In accordance with this invention, there is provided a composition embodying both paraffinic hydrocarbon waxes and calcium salts which is solid, glass-like and friable at ambient temperatures and can be ground or otherwise reduced to discrete particulate form having less tendency to fuse or coalesce on standing than the paraffinic hydrocarbon waxes by themselves. At elevated temperatures; e.g., 100°C, these compositions begin to become fluidized. This invention, therefore, provides a technique for rendering relatively soft, amorphous waxes, or those of a less pure nature, suitable for solids handling situations such as with thermoplastic extrusion formulations. Further, when used in thermoplastic extrusion formulations, there is an added benefit in that a single material provides both the paraffinic hydrocarbon wax requirement as well as the calcium salt requirement. Quite obviously, the invention is applicable to higher quality harder waxes as well but in such cases the latter advantage mentioned above is mainly realized.

It is emphasized at the outset that the composition of this invention is not a mere physical blend wherein each component contributes its individual properties without any interaction with each other. Rather, the physical form of the composition is unlike either of the individual components. The composition is best characterized as being a glass-like, friable solid and might be described as resulting from a synergistic action between the components. From a physical chemistry standpoint, it is not known what actually occurs in forming the composition although some of those skilled in the art might make analogy to the grease art.

As mentioned previously, the composition of the invention is derived from paraffinic hydrocarbon waxes and calcium salts of certain fatty acids.

The calcium salts which may be employed are those derived from $C_{16}$—$C_{24}$ aliphatic hydrocarbon monocarboxylic acids or mixtures thereof. These acids may be saturated or unsaturated. When mixtures of the acids are used, they may contain up to about 15 weight percent of a $C_{14}$ aliphatic hydrocarbon monocarboxylic acid of the same saturation characteristics outlined above. Illustrative of suitable acids are palmitic, stearic, oleic, linoleic, eicosanic, behenic, tall oil fatty acid, hydrogenated vegetable fatty acid, hydrogenated tallow fatty acid, distilled cottonseed fatty acid, and the like. Various commercial grades of suitable acids are available, some of which are listed in *Fatty Acids and Their Industrial Applications* by E. S. Pattison, 1968, at page 7, Table 1-2 (excluding high lauric). These suitable commercial acids are generally mixtures of the acids hereinbefore described and may additionally have small amounts of certain impurities depending on their method of manufacture.

The suitable paraffinic hydrocarbon waxes are generally derived from petroleum sources. These waxes contain a variety of hydrocarbon structures, for example, normal paraffins, iso-paraffins, cyclo-paraffins, small quantities of polycyclo-paraffins and aromatics and other hydrocarbons and may be in a purified form or may contain oils depending upon their source and/or manner of recovery. The paraffinic hydrocarbon waxes which are particularly useful are those having a drop melting point (ASTM D127-63) of at least 110°F, preferably at least 145°F, an oil content (ASTM D721-65T) of not greater than 50 weight percent, preferably not greater than 20 weight percent, and a needle penetration value at 77°F (ASTM D1321-65) in the range of 1 mm to 20 mm, preferably 1 mm to 10 mm.

The composition of the invention may be prepared by charging the calcium salt and paraffinic hydrocarbon wax to a heated vessel equipped with an agitator. It may be desirable to melt the wax before charging to the vessel. Small amounts of water may be present as is known in the grease art. With continued agitation, the ingredients are heated to at least 150°C, preferably at least 180°C. During this heat-up time, the wax initially becomes molten forming a continuous phase in which the calcium salt particles are dispersed followed by a subsequent increase in viscosity until the mass reaches a homogenous paste-like consistency. As the temperature continues to rise, the paste-like mass breaks into a separate low-viscosity oil-like phase and a heavier paste-like phase. Then the heavier paste-like phase appears to form soft bead-like masses and the low-viscosity oil-like phase disappears into the masses. With the temperature continuing to rise the soft bead-like masses fuse and coalesce into a homogeneous taffy-like material. It is at this point that the final temperature as hereinbefore noted will be reached and the composition of the invention is formed. Heating may be continued for a short period of time to insure completion of the transformation, even to higher temperatures short of degradative temperatures.

The hot mass is then removed from the vessel and cooled to ambient conditions whereupon the composition becomes a solid, glass-like friable material which can be ground or otherwise reduced to a particular form which substantially retains its discreteness and integrity. While the composition is a solid at ambient conditions and can be easily fractured or chopped at these conditions, it is perhaps more convenient and somewhat easier to grind the composition under cryogenic conditions. In either situation, the resultant particulate composition at ambient conditions can be easily handled with conventional solids handling equipment. Further, the particulate composition substantially maintains its integrity upon standing or being stored.

Generally, the compositions of this invention will be derived from at least 30 weight percent calcium salt. Amounts of the calcium salt greater than this may be used as desired depending on the use of the ultimate composition. A particularly suitable use for the compositions of the invention is as extrusion aids in thermoplastic extrusion formulations such as those based on polyvinyl chloride and for this end-use satisfactory weight ratios of calcium salt to wax may range from about 30/70 to about 70/30.

It is also possible to incorporate other additives into the compositions such as when they are employed as extrusion aids or lubricants. In these instances other processing aids such as polyethylene waxes or acrylate polymers may be included, pigments such as $TiO_2$, fillers, and even reinforcing materials may be included.

The invention will be further illustrated by the following examples.

EXAMPLE 1

A three-necked flask equipped with a mechanical stirrer was charged with about 100 g of molten paraffinic hydrocarbon wax. The petroleum derived paraffinic hydrocarbon wax had an average drop melting point of about 148°F, an average oil content of about 16 percent, and an average needle penetration value (77°F) of about 8.1 mm. With continuous stirring about 63 g of commercial grade calcium stearate (Witco G 339/S) was added incrementally while the mixture was heated with a heat lamp to temperatures in the range of 180°–190°C. The mechanical stirrer, it was noted, did not provide optimum agitation. In any event, at the 180°–190°C temperatures, the mixture was a taffy-like material which, upon cooling to ambient temperatures, became considerably harder and more friable than the original wax. Due to the less than optimum agitation, some unchanged pockets of wax were present in the final product but, nevertheless, the composition of the invention was demonstrated.

EXAMPLE 2

The procedure of Example 1 was again carried out except that 100 g of the commercial grade calcium stearate was incrementally added to the wax and an oil bath was used for heating. The final product, on cooling to ambient temperatures, was substantially similar to that of Example 1.

EXAMPLE 3

In a comparative experiment, 100 g of molten petroleum derived paraffinic wax (as used in Example 1) was charged to a Waring blender and 81 g of commercial grade calcium stearate were added incrementally with agitation and while heating with a heat lamp to temperatures of only about 100°C. After mixing thoroughly at this temperature the mixture was cooled to ambient conditions. The final product was very dissimilar to those of Examples 1 and 2 and resembled merely a physical mixture of the two components; e.g., a powdered solid dispersed through a soft wax. The product was by no means hard or friable.

EXAMPLE 4

Using a Hobart mixer for better agitation, equipped with an electric heating mantel, 255 g of a molten petroleum derived paraffinic wax were charged followed by incremental addition of 300 g of commercial grade calcium stearate with agitation and heating. The wax had an average drop melting point of about 148°F., an average oil content of about 16 percent and an average needle penetration value (77°F) of about 8.1 mm. While heating the mixture to about 190°C, it was observed that the several phases described hereinbefore in the specification occurred and the product at the elevated temperatures was homogenous and taffy-like. After cooling to room temperature, it became a hard, friable solid that could be ground or chopped easily.

EXAMPLE 5

Using a Brabender with a Sigma blade, about 170 g of a molten (Code 784) were charged followed by incremental addition of about 200 g of calcium stearate (commercial grade - Witco G339/S) with mixing and heating. The wax had an average drop melting point of about 165°F, an average oil content of about 3 weight percent and an average needle penetration value (77°F) of 1.5 mm. While heating the mixture to about 190°C, the several phases described hereinbefore in the specification were observed. The product at the elevated temperatures was homogenous and taffy-like. Upon cooling to ambient conditions, the product became hard, friable and glass-like. The product was then ground into discrete particles at ambient conditions using a Revel food grinder.

EXAMPLE 6

To demonstrate the unique ability of the compositions of the invention in retaining their discreteness compared to a commercial wax used as an extrusion aid in PVC formulations, several tests were run as follows:

20 g of a powdered sample (all of which passes a USS 30 mesh sieve) were placed in a 100 ml graduated cylinder (2.5 cm diameter). The loose volume was noted and a weight was placed on top and the initial compacted volume was noted. The sample was allowed to stand under weight for 1 hour at room temperature and the volume was again noted. The sample was then placed in an oven maintained at 60°C for 1 hour and the volume was again noted.

The particulars of each run together with the results are indicated in the table.

TABLE I

| | | VOLUME MEASUREMENTS (ml) | | | |
|---|---|---|---|---|---|
| Run No. | Weight (g) | Loose | Initial | Room Temperature 1 Hr | 60°C 1 Hr |
| 1[A] | 250 | 53 | 45 | 42 | 33[d] |
| 2[b] | 250 | 50 | 46 | 45 | 43 |
| 3[b] | 450 | 57 | 47 | 46 | 44 |
| 4[c] | 450 | 53 | 48 | 46 | 43 |

[a]Commercial paraffinic wax used in thermoplastic formulations as extrusion aid, Aristowax XL-165.

TABLE I-Continued

| | | VOLUME MEASUREMENTS (ml) | | | |
|---|---|---|---|---|---|
| Run No. | Weight (g) | Loose | Initial | Room Temperature 1 Hr | 60°C 1 Hr |

$^b$Composition of invention prepared as described in Example 4 except weight ratio of wax to calcium stearate was 0.85/1.
$^c$Composition of invention prepared as described in Example 4 except weight ratio of wax to calcium stearate was 1.1/0.8.
$^d$Sample had fused to a solid cake.

EXAMPLE 7

Compositions of the invention may be prepared with similar results using the procedure of Example 5 employing calcium palmitate or calcium tallate in place of the calcium stearate.

As indicated hereinbefore, the compositions of this invention are suitable for use as extrusion aids in polymer formulations intended for processing by extrusion. These compositions not only provide the requirements of both the heretofore separately employed waxes and fatty acids salts but they also do not suffer from dusting problems when dry blended into extrusion formulations.

Thus having described the invention in detail, it will be understood by those skilled in the art that certain modifications and variations may be made without departing from the spirit and scope of the invention as described herein and defined in the appended claims.

We claim:

1. A process which comprises mixing a paraffinic hydrocarbon wax and calcium salt of a fatty acid while heating to a temperature of at least 150°C and thereafter cooling to recover a solid, glass-like, friable composition, said paraffinic hydrocarbon wax having a drop melting point of at least 110°F, an oil content of not greater than 50 percent by weight and a needle penetration value at 77°F in the range of 1 mm to 20 mm, and said fatty acid being a $C_{16}$—$C_{24}$ aliphatic hydrocarbon monocarboxylic acid or mixtures thereof.

2. A process according to claim 1 wherein the mixture is heated to at least 180°C.

3. A process according to claim 1 wherein the paraffinic hydrocarbon wax has a drop melting point of at least 145°F, an oil content of not greater than 20 weight percent, and a needle penetration value at 77°F in the range of 1 mm to 10 mm.

4. A process according to claim 1 wherein the fatty acids is a mixture of fatty acids containing up to 15 weight percent of a $C_{14}$ aliphatic hydrocarbon monocarboxylic acid.

5. A process according to claim 1 wherein the fatty acid is palmitic acid, stearic acid, oleic acid, linoleic acid, eicosanic acid, behenic acid, tall oil fatty acid, or mixtures thereof.

6. A process according to claim 1 wherein at least 30 weight percent calcium salt is employed.

7. A process according to claim 6 wherein the weight ratio of calcium salt to wax is in the range of 30/70 to 70/30.

8. A composition which is friable at ambient conditions prepared by the process of claim 1.

9. A composition which is friable at ambient conditions prepared by the process of claim 2.

10. A composition according to claim 9 wherein at least 30 weight percent calcium salt is employed.

* * * * *